(12) United States Patent
Davis et al.

(10) Patent No.: US 10,987,557 B2
(45) Date of Patent: *Apr. 27, 2021

(54) FLEXIBLE GOLF CLUB GRIP WITH STABLE CAP

(71) Applicant: Eaton Intelligent Power Limited, Dublin (IE)

(72) Inventors: Stephen James Davis, Pinehurst, NC (US); Gregory William Cavill, Pinehurst, NC (US); Joshua Cliff Stokes, Pinehurst, NC (US); Alex Lee Walls, Laurinburg, NC (US); Andy Allan Arrington, Laurinburg, NC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 16/795,808

(22) Filed: Feb. 20, 2020

(65) Prior Publication Data
US 2020/0188751 A1    Jun. 18, 2020

Related U.S. Application Data

(62) Division of application No. 16/202,147, filed on Nov. 28, 2018, now Pat. No. 10,610,753.

(51) Int. Cl.
*A63B 53/14* (2015.01)
*A63B 60/08* (2015.01)
(Continued)

(52) U.S. Cl.
CPC .............. *A63B 60/08* (2015.10); *A63B 53/14* (2013.01); *A63B 60/14* (2015.10); *A63B 60/16* (2015.10);
(Continued)

(58) Field of Classification Search
CPC ......... A63B 60/08; A63B 53/14; A63B 60/16; A63B 60/14; A63B 60/02; A63B 2209/023; A63B 2102/32; A63B 2209/00; A63B 2209/02; A63B 2220/833; A63B 60/52; B29C 43/18; B29C 2043/181; B29L 2031/5227; B29K 2021/003;
(Continued)

(56) References Cited

U.S. PATENT DOCUMENTS 4,674,746 A     6/1987  Benoit
4,936,586 A *   6/1990  Van Raemdonck ... A63B 49/08
                                                 473/519
(Continued)

*Primary Examiner* — Stephen L Blau
(74) *Attorney, Agent, or Firm* — Fay Sharpe LLP

(57) ABSTRACT

A flexible elastomeric grip for the shaft of a golf club having an end cap with a cavity for receiving a sensor and/or counterweight. The cap has a durometer hardness equal to or greater than the tubular body portion of the grip and a flange sized to match the larger diameter of the body, with a sleeve engaging the inner periphery of the larger end of the tubular body. In one version of the cap, the sleeve portion is extended in length and has stiffening ribs on the outer surface of the sleeve; and, in another version, the sleeve is shorter and may also have stiffening ribs on the outer surface of the sleeve. In another version of the cap, fibrous material is disposed in the flange and sleeve to increase lateral stiffness without increasing durometer.

5 Claims, 6 Drawing Sheets

(51) Int. Cl.
*A63B 60/16* (2015.01)
*A63B 60/14* (2015.01)
*B29C 43/18* (2006.01)
*B29L 31/52* (2006.01)
*B29K 21/00* (2006.01)
*B29K 711/10* (2006.01)
*B29K 709/08* (2006.01)
*A63B 102/32* (2015.01)
*A63B 60/02* (2015.01)

(52) U.S. Cl.
CPC .............. *B29C 43/18* (2013.01); *A63B 60/02* (2015.10); *A63B 2102/32* (2015.10); *A63B 2209/023* (2013.01); *B29C 2043/181* (2013.01); *B29K 2021/003* (2013.01); *B29K 2677/10* (2013.01); *B29K 2709/08* (2013.01); *B29K 2711/10* (2013.01); *B29K 2713/00* (2013.01); *B29L 2031/5227* (2013.01)

(58) Field of Classification Search
CPC ............ B29K 2713/00; B29K 2711/10; B29K 2709/08; B29K 2677/10; B29K 2277/10; B29K 2311/10; B29K 2309/08; B29K 2311/00
See application file for complete search history.

(56) References Cited

U.S. PATENT DOCUMENTS

| | | | | |
|---|---|---|---|---|
| 6,106,418 | A * | 8/2000 | Hagey | A63B 49/08 |
| | | | | 473/551 |
| 7,771,289 | B2 * | 8/2010 | Palumbo | A63B 59/50 |
| | | | | 473/324 |
| 7,909,705 | B2 * | 3/2011 | Gill | A63B 60/10 |
| | | | | 473/297 |
| 7,931,544 | B2 | 4/2011 | Gill | |
| 8,932,145 | B2 * | 1/2015 | Hachiro | A63B 53/14 |
| | | | | 473/300 |
| 9,676,094 | B1 | 6/2017 | Davis et al. | |
| 10,315,083 | B1 * | 6/2019 | Moreira | A63B 60/16 |
| 10,328,320 | B2 * | 6/2019 | Goji | A63B 53/14 |
| 2007/0099718 | A1 | 5/2007 | McLaurin et al. | |
| 2013/0123388 | A1 * | 5/2013 | Kurihara | C08L 77/02 |
| | | | | 523/223 |
| 2014/0066222 | A1 | 3/2014 | Huang | |
| 2017/0182387 | A1 * | 6/2017 | Phelan, Jr. | A63B 59/20 |
| 2017/0296893 | A1 * | 10/2017 | Davis | A63B 53/14 |

* cited by examiner

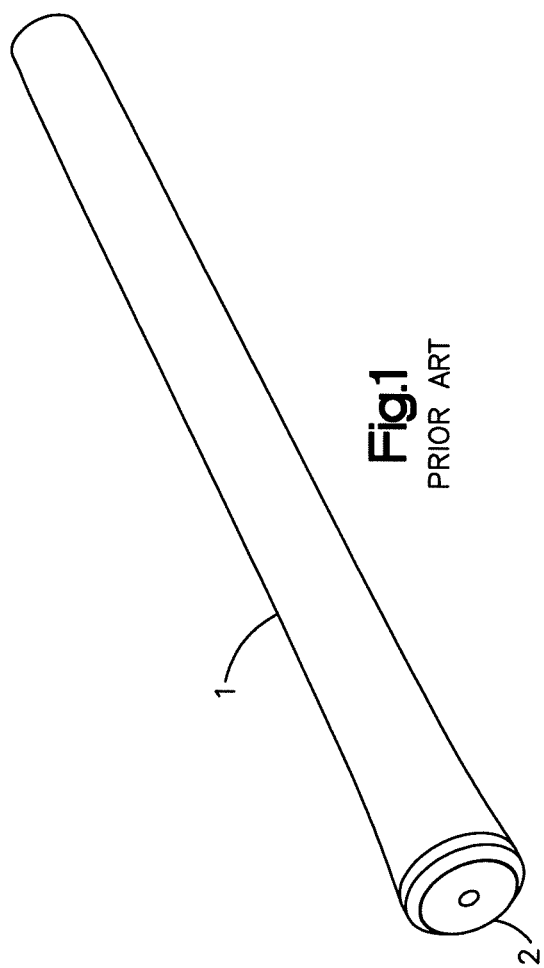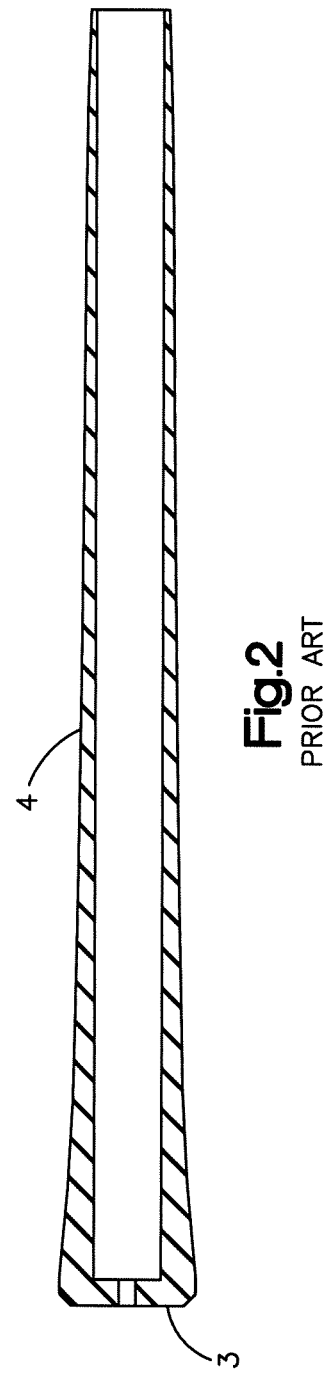

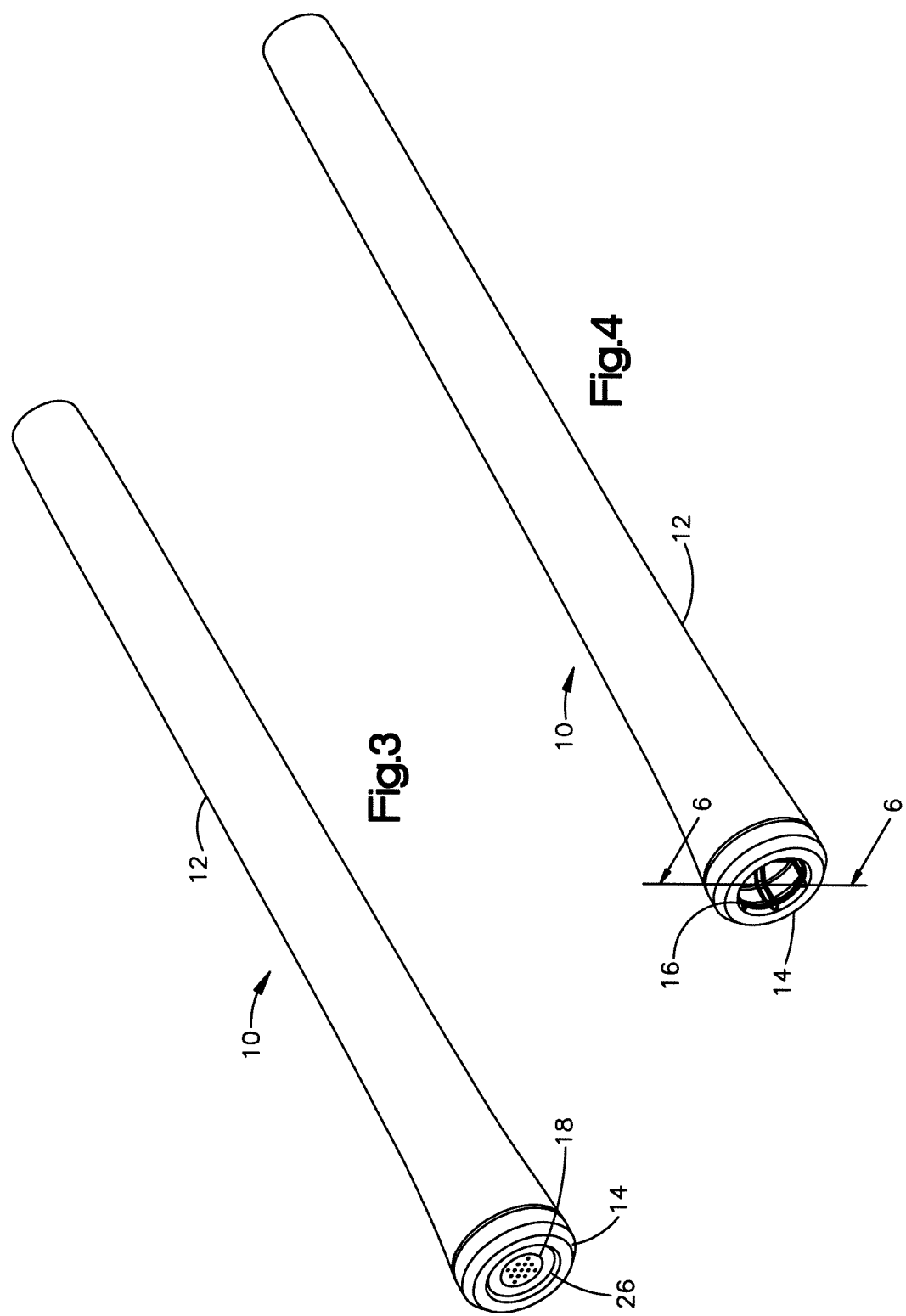

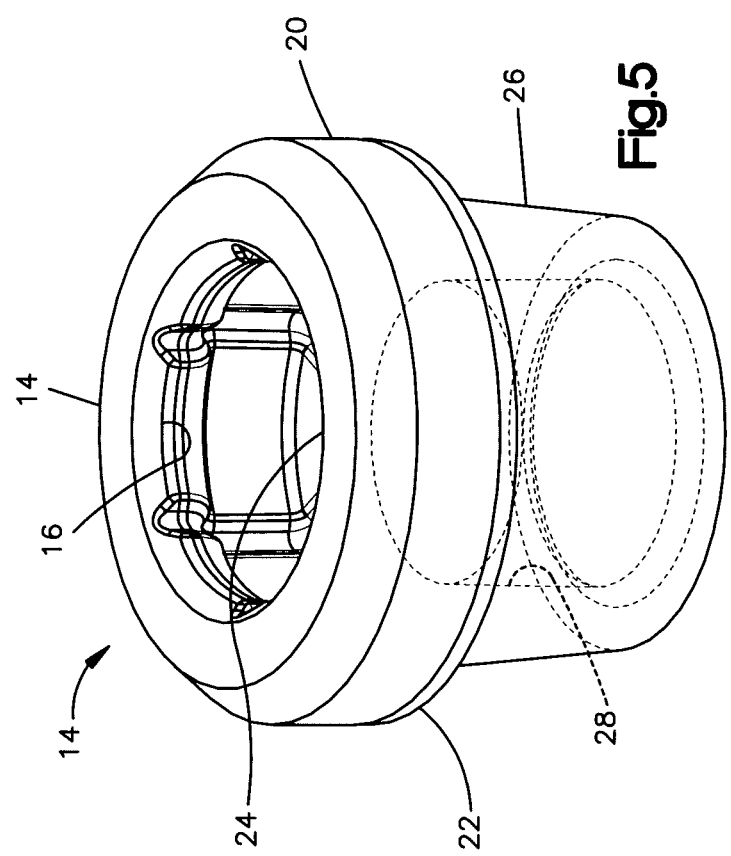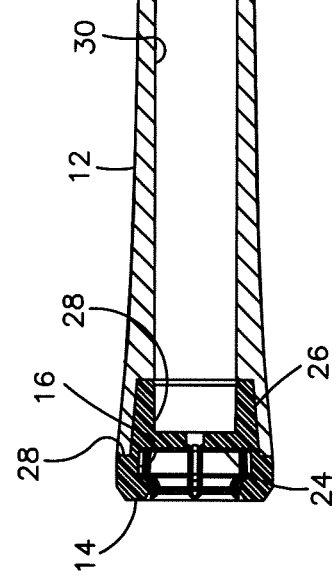

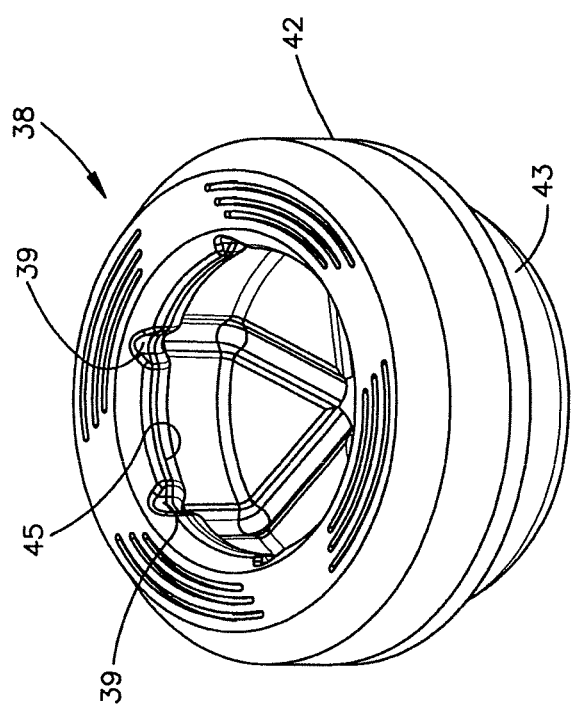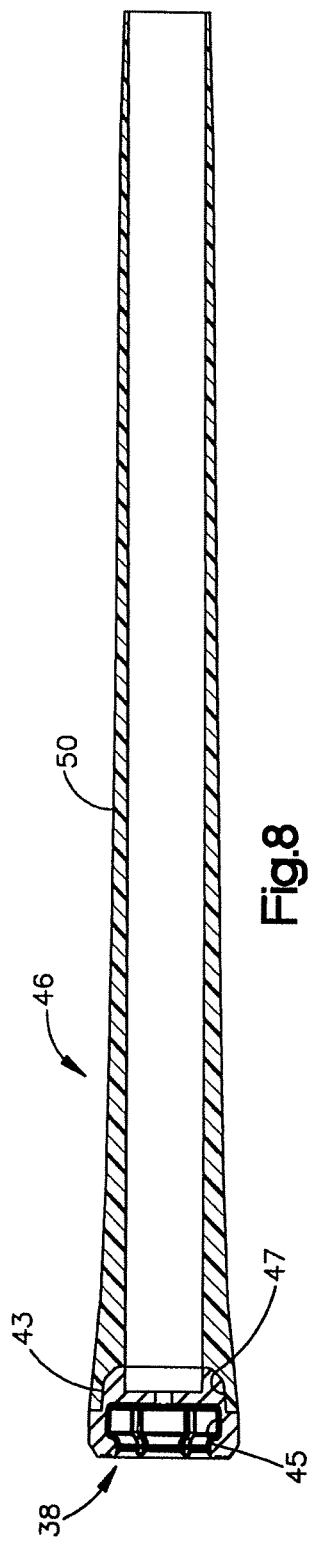

FLEXIBLE GOLF CLUB GRIP WITH STABLE CAP

The present application is a divisional of U.S. application Ser. No. 16/202,147 filed Nov. 28, 2018, now U.S. Pat. No. 10,610,753.

BACKGROUND

The present disclosure relates to flexible grips for the shaft of a golf club and particularly such grips made from elastomeric material. Typically, such grips are formed of elastomeric material sized so as to be slightly stretched when received over the club shaft to provide sufficient friction to resist the forces applied to the club during the downswing.

FIG. 1 is a perspective view of a flexible elastomeric grip for a golf club shaft currently in widespread use showing a body portion 1 with an end cap 2 which is usually formed of elastomeric material having a higher durometer than the body portion.

FIG. 2 shows a cross section of an elastomeric flexible grip for a golf club shaft of the type currently in widespread use as having an integrally formed substantially closed end 3 molded simultaneously with the body portion 4 to form a one-piece grip.

It has been desired to employ electronic sensors or counterweight in the butt end of the grip in order to measure the swing characteristics such as, for example, the speed of the downswing and the arc or plane of movement. It is proposed to locate such a sensing device in a cavity formed in a cap provided on the end of the grip because the cap has the largest diameter of the grip. If the length of the grip is extended beyond the end of the club shaft in order to provide additional space to accommodate the sensor or counterweight, the grip becomes less resistant to bending and this can result in increased lateral deflection or oscillation of the grip which results in "wobble" that can create an unstable feel for the user resulting in degradation of the quality of the downswing. The phenomenon can be particularly troublesome where a balance counterweight is included in the cap, particularly if counterweight is employed in conjunction with a sensing device resulting in a significant increase in the length beyond the club shaft due to the requirement for a larger cavity in the cap.

Efforts to reduce the cap wobble and resistance to lateral deflection, particularly where the sensing device and/or counterweight are employed in the cap, have been directed to forming the cap from a harder elastomer or elastomer having a higher durometer than the remaining portions of the flexible grip. However, if the harder material is present on the exterior surface of the golf grip, this results in a harsher feel and less slip resistance than experienced with elastomer of lesser durometer and will lessen the feel of the grip to the user. Thus, it has been desired to find a way to accommodate sensing devices and/or counterweights in the cap of an elastomeric golf club grip in a manner which does not degrade the feel of the grip and yet provides resistance to lateral deflection or wobble.

SUMMARY

The flexible golf club grip of the present disclosure provides a cap with a cavity which accommodates a sensing device and/or counterweight without significantly changing the feel of the grip and provides sufficient stiffness to resist lateral deflection or wobble which can be created by the weight of the sensing device and/or counterweight without increasing the overall hardness and weight of the grip.

BRIEF DESCRIPTION OF THE DRAWINGS

FIG. 1 is a perspective view of an elastomeric grip for a golf club shaft in accordance with the prior art;

FIG. 2 is a cross-sectional view of one version of a flexible grip for a golf club shaft of the prior art;

FIG. 3 is a perspective view of one version of a flexible elastomeric grip for a golf club shaft with a sensor in the cap in accordance with the present disclosure;

FIG. 4 is a view of the grip of FIG. 3 without the sensor;

FIG. 5 is an enlarged perspective view of the cap for the grip of FIG. 4;

FIG. 6 is a section view of the grip of FIG. 4 taken along section indicating lines 6-6;

FIG. 7 is a perspective view of another version of the cap for a flexible grip of the present disclosure;

FIG. 8 is a section view of a flexible grip of the present disclosure embodying the cap of FIG. 7;

FIG. 9b is a direct side view of the cap of FIG. 9a;

DETAILED DESCRIPTION

Figure 9A:
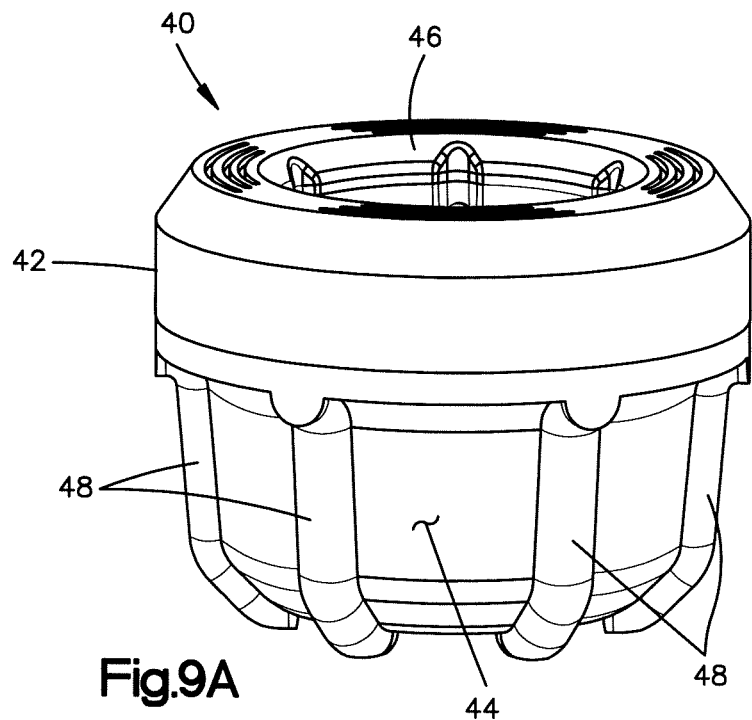
FIG. 9a is a perspective view of another version of the cap of the grip of the present disclosure.

Referring to FIG. 3, a flexible grip for a golf club shaft of the present disclosure is indicated generally at 10, having a tubular body portion 12, and an end cap indicated generally on the distal end at 14 with a cavity 26 formed therein and a sensor 18.

Referring to FIGS. 4, 5, and 6, the version 10 is illustrated with the sensor 18 removed to show the cavity or recess 16 formed in the cap 14 for receiving therein the sensing device 18 and/or a counterweight (not shown).

Referring to FIGS. 5 and 6, the cap 14 is shown as having an annular flange portion 20, which has the undersurface 22 thereof registered against the end of the body portion 12. The recess 16 has the bottom portion thereof comprising a transverse wall 24 substantially closing the recess 16. The cap 14 has an extended tubular sleeve portion 26 extending into the inner surface of the end of the body portion 12 in closely fitting engagement. The sleeve portion 26 has the inner periphery 28 thereof sized to coincide with the inner periphery 30 of the body portion for being received over the end of the golf club shaft. In the present practice, it has been found satisfactory to form the body portion of elastomeric material having a durometer hardness in the range 30-60 on the Shore A scale and the cap 24 of elastomeric material having a durometer hardness in the range 60-80 on the Shore A scale. In the present practice, it has been found satisfactory to provide the wall 24 with a minimum thickness of 1 mm. In the present practice, it has been found satisfactory to form the extended sleeve 26 with a tubular wall thickness of at least 1 mm.

Referring to FIGS. 7 and 8, another version of the cap for a flexible elastomeric grip of the present disclosure is indicated generally at 38 and has a flange portion 42 having a diameter coincident with the outer periphery of the body portion of the grip. The flange portion 42 has a shortened tubular sleeve portion 43 extending therefrom. The cap 38 has a recess or cavity 45 formed in the end face thereof which cavity is adapted for receiving a sensor and/or counterweight therein. As shown in FIG. 7, a plurality of circumferentially spaced grooves 39 are provided about the inner periphery of the recess, pocket, or cavity 45, and may extend on the floor of the pocket, for providing air movement about a sensor or counterweight when received therein.

Referring to FIG. 8, the flexible elastomeric grip of the present disclosure is indicated generally at 46 and has the shortened sleeve portion 44 of the cap 38 of FIG. 7 received in the inner periphery 47 of body portion 50.

Figure 9B:
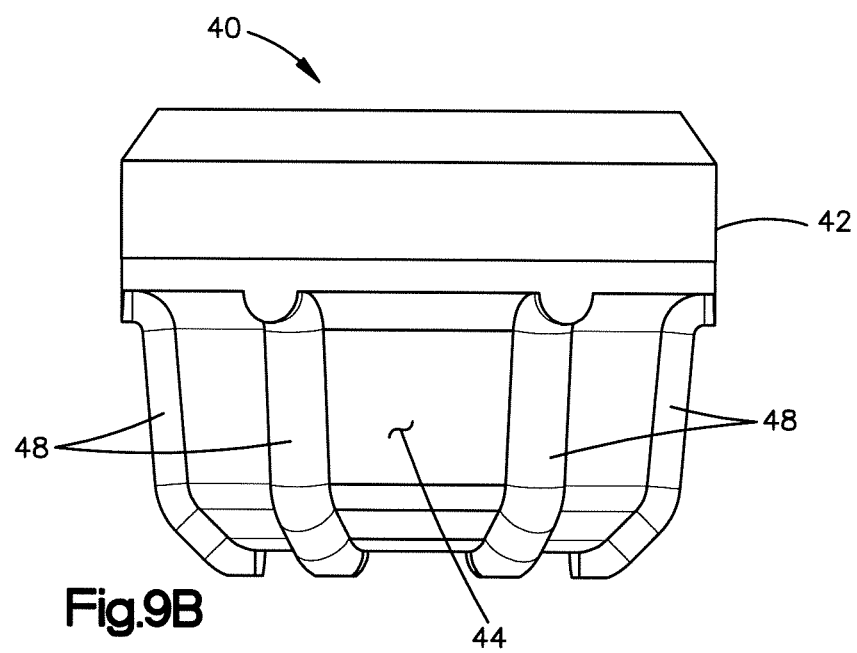

Referring to FIGS. 9a and 9b, another version of the cap is shown generally at 40, having the extended sleeve 44, is shown in detail as having a plurality of circumferentially spaced ribs 48 provided on the outer periphery of the sleeve 44 and extending longitudinally therealong. The ribs serve the purpose of providing additional stiffness to the extended sleeve 44 thereby eliminating the need to form the cap 40 of an elastomeric material having a significantly greater durometer than that of the body portion 50 of the elastomeric grip shown in FIG. 8. In the present practice, it has been found satisfactory for the ribs to have a width in the range 1-3 mm. However, the rib height should not exceed the diameter of the body 50. In the present practice, it has been found satisfactory to have the length of the sleeve 44 at least fifty percent (50%) of the diameter of the flange 42. In the present practice, it has been found satisfactory that the short sleeve version 43 has a length of at least twenty-five percent (25%) of the diameter of the flange 42.

Figure 10:
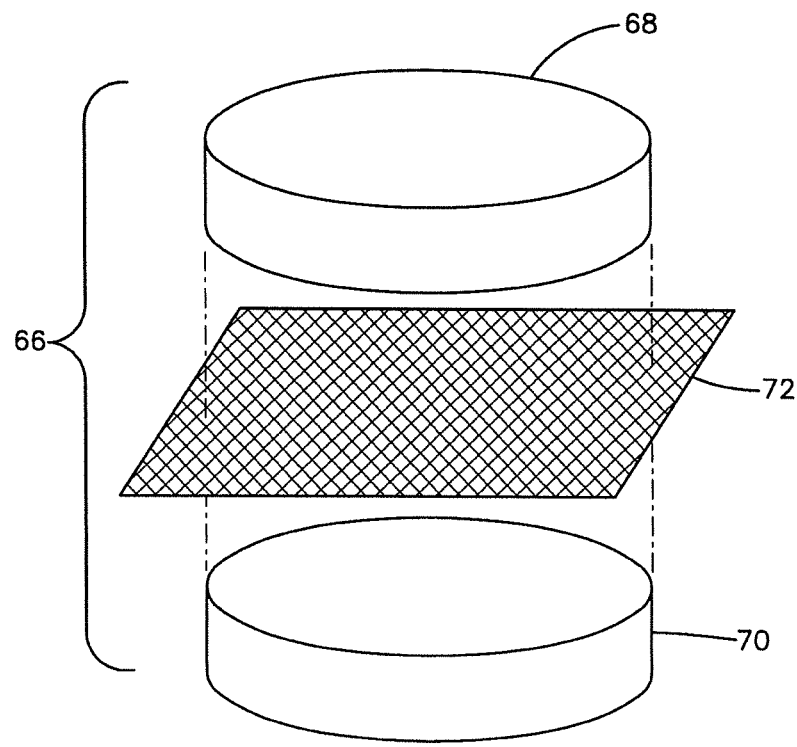
FIG. 10 is an exploded perspective view showing the arrangement for assembling a preform for another version of the cap for a grip of the present disclosure.
Figure 11:
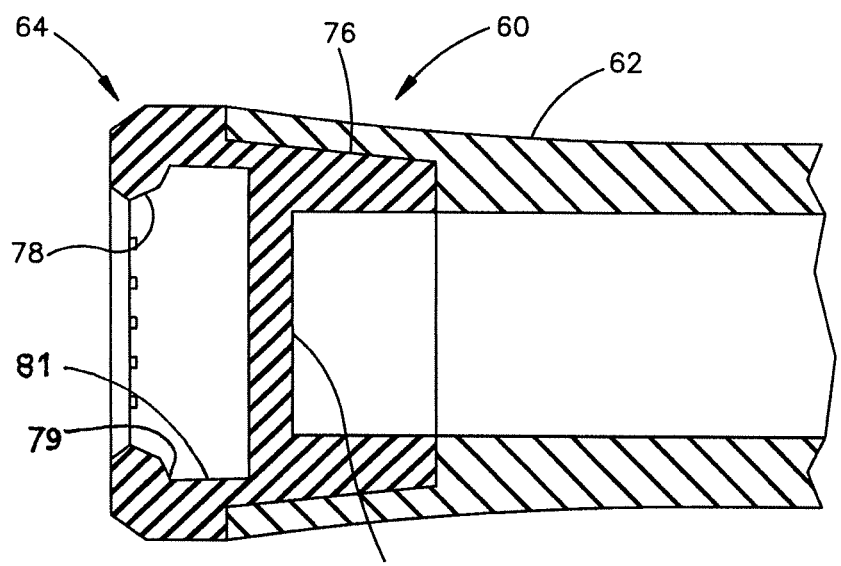
FIG. 11 is a cross-sectional view of a portion of another version of the grip of the present disclosure employing a cap made with the preform of FIG. 10.

Referring to FIGS. 10 and 11, another version of the grip of the present disclosure is illustrated partially in cross-section in FIG. 11 and denoted generally by reference numeral 60. The grip 60 includes an end cap indicated generally at 64 received in the layer end of body portion 62.

With reference to FIG. 10, the end cap 64 is comprised of a preform 66 which is initially formed of an upper layer of uncured elastomeric material 68 and a lower layer 70 of uncured elastomeric material. A layer of fibrous material 72 is disposed therebetween in a somewhat sandwich configuration. In the present practice, the fibrous material 72 may be formed of woven material or alternatively, of chopped fibers of fibers with short lengths in the range of 1-10 mm. The fibers may be mixed with the elastomeric material for uniform dispersion in the cap; and, the amount of fibrous material 72 may vary. In the present practice, the fibrous material may comprise material selected from one of cotton, flax, linen, glass, aramid fibers, and chopped or short fibers. The fibrous material is formed in the wall portion 74 and the extended sleeve portion 76 of the cap 64 with the wall portion 74 forming the bottom of the sensor receiving cavity entrance 78. As shown in FIGS. 6, 8, and particularly, FIG. 11, the entrance to the cavity is undercut at 79 such that the diameter of the entrance 78 to the cavity is reduced in size, e.g., having a smaller diameter than the remainder 81 of the cavity for positively retaining a sensor, such as sensor 18 (see FIG. 3) or counterweight upon installation of such in the cavity. In the present practice, the preform 66 is inserted in a mold with the elastomeric material for forming the body portion 62 and both are simultaneously compression molded to form the grip 60. The regions of the cap 64 incorporating the fibrous material are illustrated in quadrille-ruled cross-hatching in FIG. 11. The version 60 of the grip thus enables a stiffening of the extended sleeve portion 76 of the end cap by virtue of the embedded resinous material, as an alternative construction for providing increased lateral stiffness without the need to increase the durometer of the elastomeric material.

The present disclosure thus describes a flexible elastomeric grip for a golf club shaft having a recess or pocket provided in the cap of the grip for receiving a sensor and/or a counterweight. Increased lateral stiffness is provided for the cap without the need to significantly increase the durometer of the cap portion from that of the body portion of the grip.

The exemplary embodiment has been described and illustrated with reference to the drawings. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A flexible grip for a golf club shaft comprising:
   (a) a tubular member of elastomeric material having an open end for being received over the club shaft and an end distal the open end having a cap received thereover;
   (b) a cavity formed in an exterior surface of the cap, wherein the cavity is configured for receiving a sensor therein; and
   (c) a plurality of air channels formed in the inner periphery of the cavity operative for providing air movement about a sensor upon receipt thereof in the cavity.

2. The flexible grip of claim 1, wherein the air channels are disposed in peripherally equally spaced arrangement.

3. A flexible grip for a golf club shaft comprising:
   (a) a tubular member of elastomeric material having an open end for being received over the club shaft and an end distal the open end having a cap received thereon;
   (b) the cap having a tubular sleeve received in the distal end of the tubular member; and
   (c) the sleeve having an upper layer and a lower layer of elastomeric material with a layer of fibrous material disposed therebetween.

4. The flexible grip of claim 3, wherein the fibrous material is selected from one of (i) cotton, (ii) flax, (iii) linen, (iv) aramid fibers, and (v) glass.

5. A flexible grip for a golf club shaft comprising:
   (a) a tubular member of elastomeric material having an open end for being received over the club shaft and an end distal the open end having a cap received thereon;
   (b) the cap having a tubular sleeve received in the distal end of the tubular member; and
   (c) the sleeve having fibrous material dispersed therein, wherein the fibrous material includes woven material.

* * * * *